(12) United States Patent
Shikama et al.

(10) Patent No.: US 9,294,898 B2
(45) Date of Patent: Mar. 22, 2016

(54) COMMUNICATION TERMINAL AND WARNING INFORMATION OBTAINING METHOD

(75) Inventors: Hiroki Shikama, Chiyoda-ku (JP); Makoto Sasaki, Chiyoda-ku (JP); Takeshi Higuchi, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 67 days.

(21) Appl. No.: 13/983,075

(22) PCT Filed: Aug. 13, 2012

(86) PCT No.: PCT/JP2012/070628
§ 371 (c)(1),
(2), (4) Date: Aug. 1, 2013

(87) PCT Pub. No.: WO2013/024841
PCT Pub. Date: Feb. 21, 2013

(65) Prior Publication Data
US 2013/0309995 A1  Nov. 21, 2013

(30) Foreign Application Priority Data

Aug. 17, 2011  (JP) .................................. 2011-178294

(51) Int. Cl.
*H04W 4/22* (2009.01)
*H04W 48/18* (2009.01)
(Continued)

(52) U.S. Cl.
CPC ................ *H04W 4/22* (2013.01); *H04H 20/24* (2013.01); *H04H 20/26* (2013.01); *H04H 20/57* (2013.01);
(Continued)

(58) Field of Classification Search
CPC ......... H04W 4/22; H04W 4/02; H04W 6/007; H04H 20/59; H04H 20/24; G08B 27/006; G08B 27/008
USPC ....................................................... 455/404.1
See application file for complete search history.

(56) References Cited

U.S. PATENT DOCUMENTS

| 2007/0032225 A1* | 2/2007 | Konicek et al. ................ 455/417 |
| 2010/0056181 A1* | 3/2010 | Rippon et al. ............. 455/456.3 |
| 2010/0173602 A1* | 7/2010 | Muramatsu ................ 455/404.1 |

FOREIGN PATENT DOCUMENTS

| JP | 2007 36878 | 2/2007 |
| JP | 2007 97016 | 4/2007 |

(Continued)

OTHER PUBLICATIONS

Office Action issued Jan. 21, 2014 in Japanese Patent Application No. 2011-178294 (with English translation).

(Continued)

*Primary Examiner* — Khalid Shaheed
*Assistant Examiner* — Ernest Tacsik
(74) *Attorney, Agent, or Firm* — Oblon, McClelland, Maier & Neustadt, L.L.P.

(57) ABSTRACT

A communication terminal includes: a first receiving unit configured to receive a communication signal in a first communication system; a second receiving unit configured to receive a communication signal in a second communication system; a position information obtaining unit configured to obtain position information of a user; a mode determination unit configured to activate the second receiving unit if the position information obtaining unit obtains position information of the user in a case where the first receiving unit cannot receive a communication signal; and a user interface unit configured to provide the user with warning information extracted from the communication signal received by the second receiving unit.

7 Claims, 4 Drawing Sheets

(51) Int. Cl.
*H04W 4/02* (2009.01)
*H04W 76/00* (2009.01)
*H04H 20/24* (2008.01)
*H04H 20/26* (2008.01)
*H04H 20/59* (2008.01)
*H04H 60/51* (2008.01)
*H04H 60/85* (2008.01)
*H04H 20/57* (2008.01)
*H04W 88/06* (2009.01)
*H04M 1/725* (2006.01)

(52) U.S. Cl.
CPC .............. *H04H 20/59* (2013.01); *H04H 60/51* (2013.01); *H04H 60/85* (2013.01); *H04W 4/02* (2013.01); *H04W 48/18* (2013.01); *H04W 76/007* (2013.01); *H04M 1/72536* (2013.01); *H04W 88/06* (2013.01); *Y02B 60/50* (2013.01)

(56) References Cited

FOREIGN PATENT DOCUMENTS

| | | |
|---|---|---|
| JP | 2007097016 A * | 4/2007 |
| JP | 2007 142744 | 6/2007 |
| JP | 2007-243936 | 9/2007 |
| JP | 2008-124744 | 5/2008 |

OTHER PUBLICATIONS

Nakao, M. et al., "Emergency Information Broadcasting Distribution System", NTT DoCoMo Technical Journal, Total 13 Pages, vol. 15, No. 4, ( 2008 ) ( with English translation ).

International Search Report Issued Sep. 11, 2012 in PCT/JP12/070628 filed Aug. 13, 2012.

Office Action mailed Dec. 1, 2015 in Chinese Patent Application No. 201280014222.8 (with English Translation).

* cited by examiner

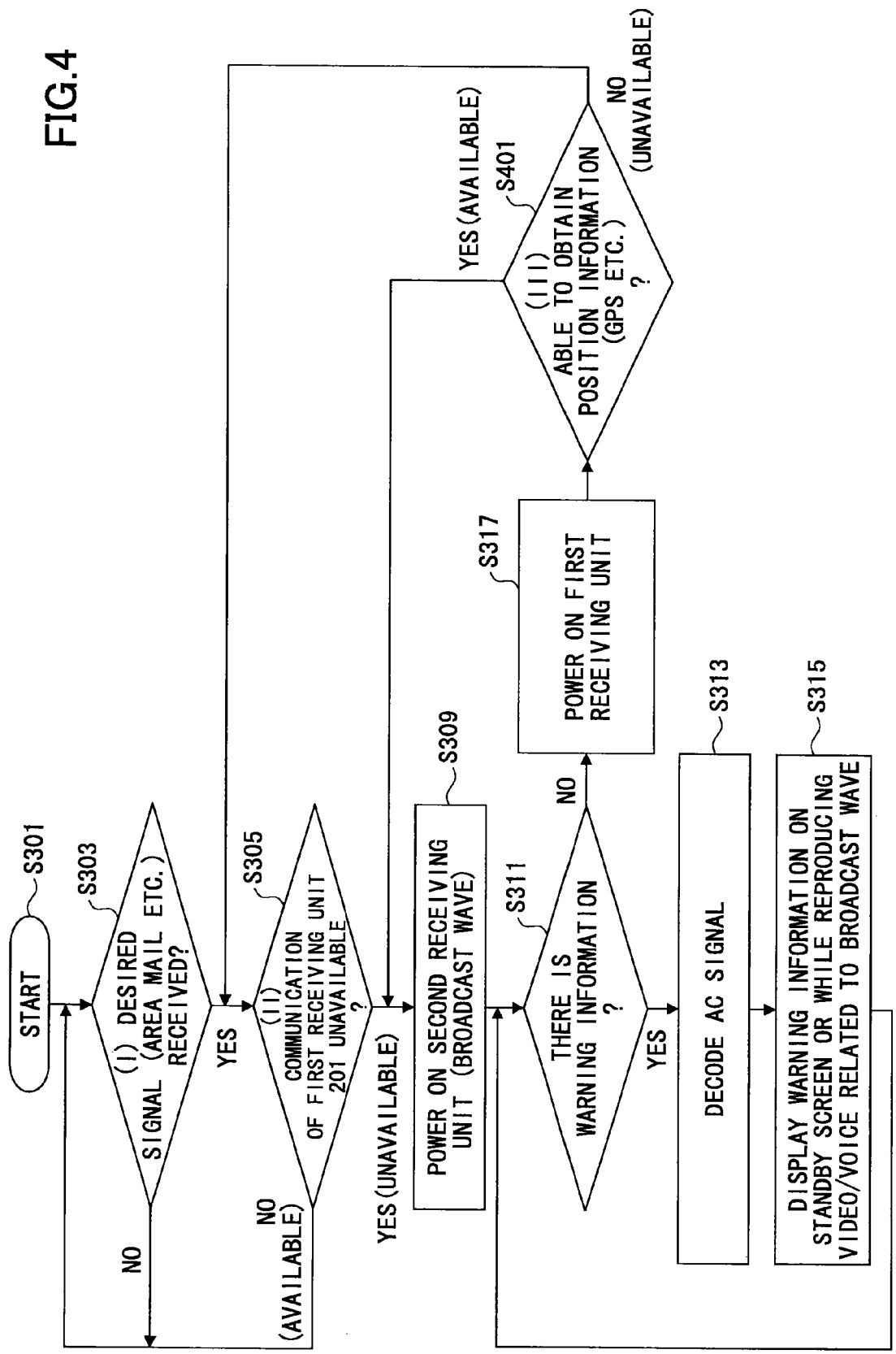

COMMUNICATION TERMINAL AND WARNING INFORMATION OBTAINING METHOD

TECHNICAL FIELD

The present invention relates to a communication terminal and a warning information obtaining method.

BACKGROUND ART

Recently, unprecedented natural disasters have occurred domestically and internationally, and interest regarding countermeasures against disasters is growing more than before. To reduce the damage caused by such disasters, many cellular mobile communication systems quickly report the state of emergency to many users by simultaneously broadcasting urgent warning information such as earthquake early warning. Non-Patent Document 1 discloses such a broadcast communication service.

However, in a time of disaster, the cellular mobile communication system tends to have difficulties in providing communication services due to damage of base stations and network congestion and the like. On the other hand, a communication system performing digital terrestrial television broadcasting for mobile terminals can provide communication services relatively stably even in such a time of disaster. Therefore, a user of a mobile terminal that can receive a television signal can receive urgent warning information from the television signal even in a time of disaster. However, it is necessary that the mobile terminal is receiving the radio wave of the digital terrestrial television broadcasting for receiving the urgent warning information by the digital terrestrial television broadcasting. That is, the mobile terminal needs to be activated so as to be able to receive the digital terrestrial television broadcasting. Thus, there is a fear that consumed power of the mobile terminal becomes very large. This point is different from the cellular mobile communication system in which the terminal can receive simultaneous broadcasting of urgent warning information even in a standby mode.

In view of the above-mentioned problem, in the invention described in the patent document 1, a mobile terminal with a TV receiving function starts the TV receiving function to receive urgent broadcasting when the mobile terminal receives an e-mail or when the mobile terminal goes out of the range of communication.

RELATED ART DOCUMENT

Patent Document

Patent Document 1: JP2007-142744

Non-Patent Document

Non-Patent Document 1: NTT DOCOMO, Technical Journal Vol. 15, No. 4, 2008

SUMMARY OF THE INVENTION

Problem to be Solved by the Invention

However, like the invention described in the patent document 1, even though the TV receiving function is activated when an e-mail is received or when the mobile terminal goes out of the range of communication, the digital terrestrial television broadcasting cannot necessarily be received properly. To activate the TV receiving function in a place where the digital terrestrial television broadcasting cannot be received in order to receive a radio wave causes a communication terminal such as the mobile terminal to consume power wastefully.

An object of the present invention is to reduce a power consumption amount of a communication terminal that obtains warning information from a second communication system in a case where the communication terminal cannot perform communication in a first communication system.

Means for Solving the Problem

A communication terminal according to an embodiment is a communication terminal including:

a first receiving unit configured to receive a communication signal in a first communication system;

a second receiving unit configured to receive a communication signal in a second communication system;

a position information obtaining unit configured to obtain position information of a user;

a mode determination unit configured to activate the second receiving unit if the position information obtaining unit obtains position information of the user in a case where the first receiving unit cannot receive a communication signal; and a user interface unit configured to provide the user with warning information extracted from a communication signal received by the second receiving unit.

Effect of the Present Invention

According to an embodiment, it becomes possible to reduce a power consumption amount of a communication terminal that obtains warning information from a second communication system in a case where the communication terminal cannot perform communication in a first communication system.

BRIEF DESCRIPTION OF THE DRAWINGS

FIG. 4 is a flowchart showing a second operation example.

EMBODIMENTS FOR CARRYING OUT THE INVENTION

Figure 1:
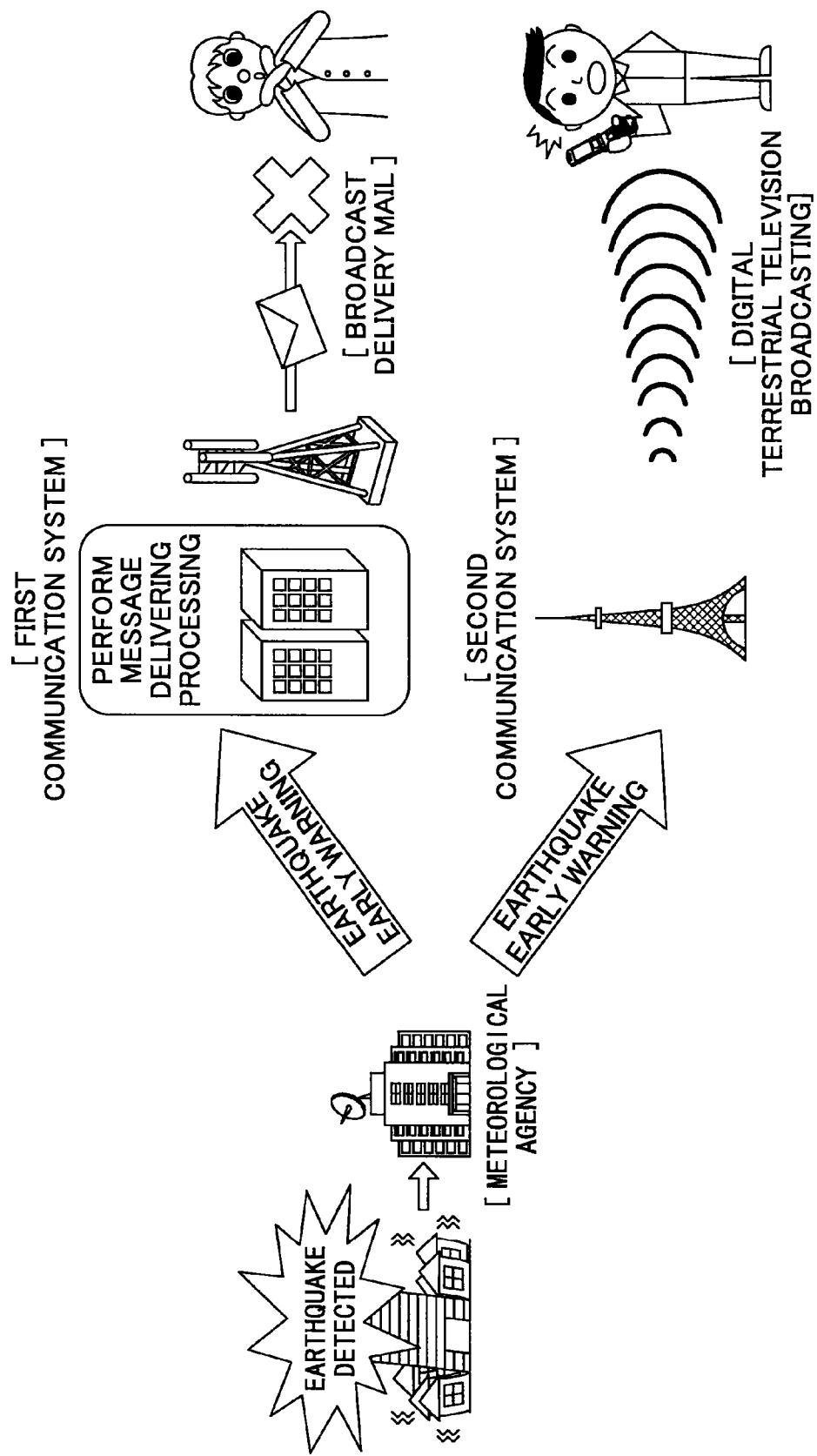
FIG. 1 is a schematic diagram of a communication system that is usable in an embodiment.

A communication terminal of the present embodiment stops communication in a first communication system and performs communication in a second communication system if the communication terminal can obtain position information of a user in a case where the communication terminal cannot perform communication in the first communication system. The communication terminal receives a communication signal in the second communication system, obtains warning information, and provides it to the user. It should be noted that the condition for activating operation in the second communication system is not only that the communication terminal cannot perform communication in the first communication system but also that the communication terminal can obtain position information of the user. The position information of the user can be obtained by the GPS scheme, for example. In the case where the position information can be obtained, it can be predicted that the communication terminal is in an outdoor communication environment, for example, and that the communication terminal can properly receive radio wave of digital terrestrial television broadcasting. On the other hand, in the case where the position information cannot be obtained, it can be predicted that the communication terminal is in an indoor communication environment, for example, and that the communication terminal cannot properly receive radio wave of digital terrestrial television broadcasting. In the case where the position information cannot be obtained, it can be predicted that, if the communication terminal tries to receive the radio wave of the second communication system, it ends up in vain. Therefore, even though communication in the first communication system cannot be performed, it is determined whether to start operation in the second communication system according to whether it is possible to obtain position information of the user. This technique can effectively solve the conventional problem in which processing in the second communication system is wastefully performed and the power of the battery is consumed.

Hereinafter, an embodiment is explained while referring to the accompanying drawings. In the drawings, the same reference numerals or the same reference symbols are attached to the same elements. The embodiment is explained from the following perspectives.

1. Communication system
2. Communication terminal
3. Operation example
3.1 First operation example
3.2 Second operation example

[Embodiment 1]

<1. Communication System>

FIG. 1 is a schematic diagram of a communication system usable in the embodiment. FIG. 1 shows entities which are particularly related to the embodiment, among various nodes, elements, and processing units included in the communication system. As shown in the figure, when an emergency such as an earthquake occurs, the Meteorological Agency sends information of earthquake early warning to various communication systems. Although only the first and the second communication systems are shown for simplifying the drawing, the number of communication systems for receiving information and delivering the information is arbitrary. Not only the Meteorological Agency but also an organization or an institution having an authority such as a municipality may deliver the information. Also, not only earthquake early warning but also other warning information giving a warning may be delivered. For example, tsunami warning, tidal wave warning, flood warning, warning of volcanic phenomenon and the like may be delivered. Further, information on man-made disaster such as international conflict may be delivered as well as the information on natural disaster.

In the example shown in the figure, the first communication system is a cellular mobile communication system providing a voice communication service, a data communication service and the like. For example, warning information from a cell broadcast entity (CBE) such as the Meteorological Agency is delivered to users in a given area simultaneously as a cell broadcast service (CBS), for example. More specifically, warning information from the CBE is received by a cell broadcast center (CBC) of the first communication system, a delivering area is determined, so that the warning information is reported, as an e-mail, to users via an exchange station and a base station.

The second communication system is a communication system that performs digital terrestrial television broadcasting for mobile terminals in the example shown in the figure. For example, warning information from the Meteorological Agency is received by each of a plurality of broadcasting stations. It should be noted that the plurality of broadcasting stations are not shown for the sake of simplification of the drawing. Each broadcasting station broadcasts urgent warning by using a channel or a frequency resource assigned to the broadcasting station. Especially, each broadcasting station performs one segment broadcasting for mobile terminals by using one of 13 segments. A broadcasting signal (one segment signal) for one segment broadcasting includes transmission data representing voice, video and the like, control information (TMCC), a pilot signal (SP), and an additional information signal (Auxiliary Channel: AC) for future extension. This AC signal includes the warning information such as the earthquake early warning.

As mentioned above, in a time of disaster, the first communication system such as the cellular mobile communication system tends to have difficulties in providing communication services. For example, there is a fear that a base station that is not placed at a high place does not work properly due to tsunami right after an earthquake. On the other hand, the second communication system that performs digital terrestrial television broadcasting for mobile terminals can provide communication services relatively stably even in the time of disaster. In general, in many cases, a tower for broadcasting a television signal can normally operate even after tsunami. But, a communication terminal needs to be activated for receiving urgent warning information transmitted by the digital terrestrial television broadcasting, so that there is a fear that consumed power of the communication terminal becomes very large. This point is different from the cellular mobile communication system in which the communication terminal can receive simultaneous broadcasting of urgent warning information in a standby mode.

As described later, in the present embodiment, in a case where communication cannot be performed in the first communication system, communication by the first communication system is stopped and communication by the second communication system is performed if position information of the user can be obtained. The communication terminal receives a communication signal in the second communication system, obtains warning information and provides the user with the warning information.

<2. Communication Terminal>

Figure 2:
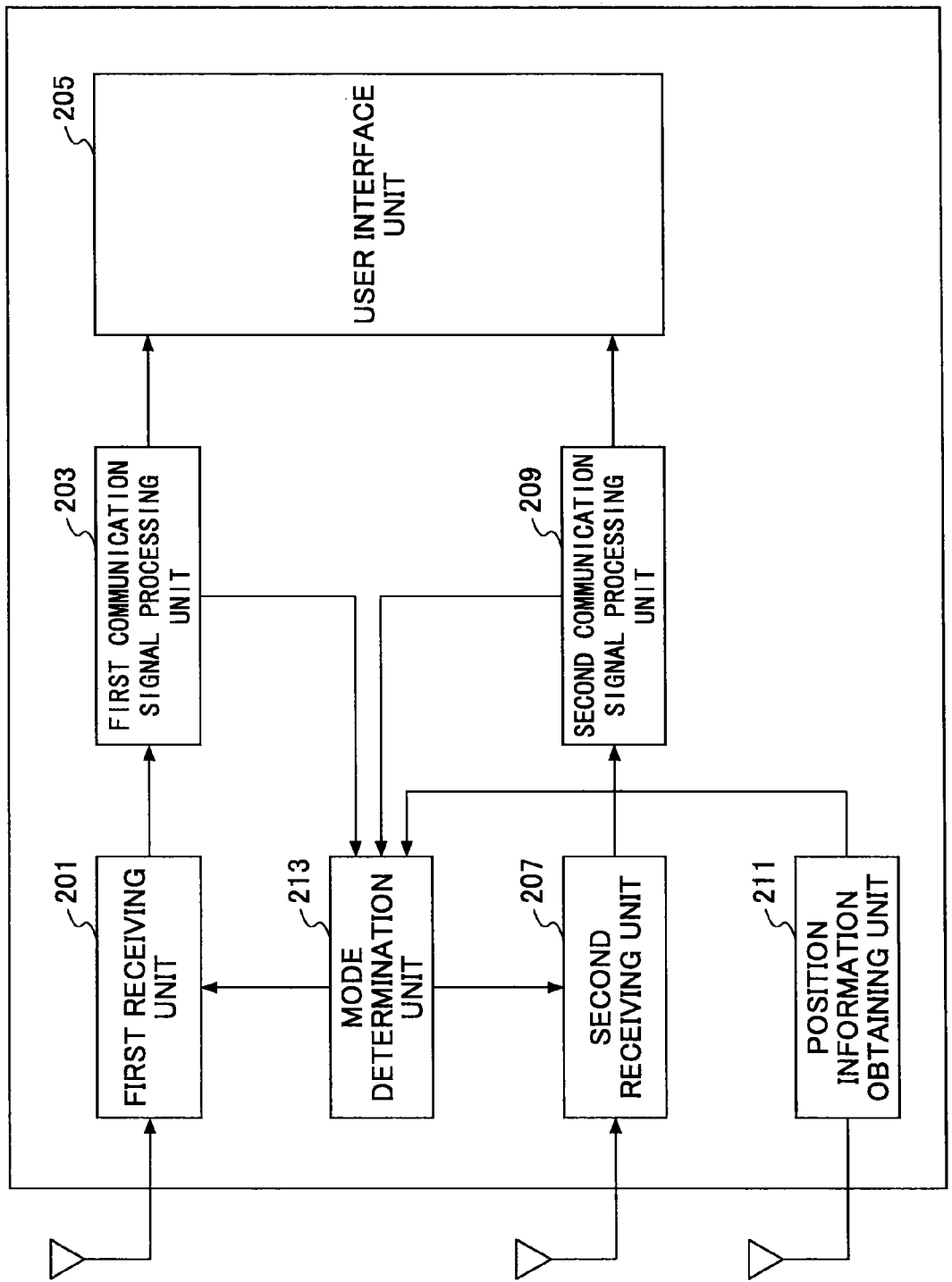
FIG. 2 shows a functional block diagram of a communication terminal.

FIG. 2 shows a functional block diagram of a communication terminal usable by a user in the communication system shown in FIG. 1. FIG. 2 shows entities which are particularly related to the embodiment, among various processing units or functional units included in the communication terminal. The communication terminal may be any proper apparatus that can operate in both of a cellular mobile communication system and a communication system that performs digital terrestrial television broadcasting. More specifically, the communication terminal may be a user apparatus, a mobile phone, an information terminal, a high functionality mobile phone, a smart phone, a tablet computer, a personal digital assistant, a mobile personal computer, a palmtop computer, a laptop computer, or a desktop computer, or the like. However, the communication terminal is not limited to these. The communication terminal includes at least a first receiving unit 201, a first communication signal processing unit 203, a user interface unit 205, a second receiving unit 207, a second communication signal processing unit 209, a position information obtaining unit 211 and a mode determination unit 213.

The first receiving unit 201 receives a communication signal in the first communication system such as the cellular mobile communication system. Such a communication signal includes a communication signal in a telephone service (origination signal, incoming signal, for example), a communication signal by a data communication service (e-mail message, a file, and other data signals), and the like. But, the communication signal is not limited to these.

The first communication signal processing unit 203 decodes the communication signal received by the first receiving unit 201, analyzes the communication signal, and supplies the decoded signal to the user interface unit 205 as necessary. Especially, in the present embodiment, the first communication signal processing unit 203 determines whether the communication signal includes warning information such as the earthquake early warning. If it is included, the first communication signal processing unit 203 supplies the warning information to the user interface unit 205. More specifically, the first communication signal processing unit 203 determines whether the communication signal includes a predetermined e-mail message. The predetermined e-mail message is an e-mail massage in the cell broadcast service (CBS), for example (area message, for example). In general, CBS is a service for simultaneously delivering simple character information. Warning information such as the earthquake early warning is delivered by the CBS. The warning information may be output visually or aurally or both via the user interface unit 205. In addition, when providing the user with the warning information, user's attention may be drawn by starting a vibrator. Information indicating whether the warning information or the predetermined e-mail message has been received is reported to the mode determination unit 213.

The user interface unit 205 has a function for providing information to the user and a function for obtaining information input by the user. The user interface unit 205 may function as any visual, aural or mechanical user interface. For example, the user interface unit 205 typically includes selectable buttons, and may include a mechanical operation unit such as a keyboard, a mouse, and a trackball and the like. Also, the user interface unit 205 may include a voice inputting unit such as a microphone such that an operation that a user speaks can be executed, and the user interface unit 205 may include a voice outputting unit such as a speaker for providing a user with information by voice. For example, information of a communication signal received by the first receiving unit 201 or the second receiving unit 207 may be output by voice, and guidance for guiding operation of the communication terminal may be output by voice. In addition, the user interface unit 205 may be provided with a visual display unit for visually outputting information. Such a display unit may be a display, a control panel including a keypad, a cathode-ray tube (CRT), a liquid crystal display (LCD), an organic electroluminescent panel, or a touch screen. However, the display unit is not limited to these. In the embodiment, the display unit in the user interface unit 205 is covered with a transparent touch-sensitive panel. The display unit can detect a motion of a finger of the user for controlling the operation of the communication terminal.

The second receiving unit 207 receives a communication signal of the second communication system that performs digital terrestrial television broadcasting, for example. In the case of the digital terrestrial television broadcasting, the second receiving unit 207 receives a communication signal (one segment signal) of the one segment broadcasting transmitted by the orthogonal frequency division multiplexing (OFDM) scheme, for example. Such a communication signal includes transmission data representing voice, video and the like, control information (TMCC), a pilot signal (SP), and an additional information signal (Auxiliary Channel: AC) for future extension. This AC signal includes the warning information such as the earthquake early warning.

The second communication signal processing unit 209 decodes the communication signal received by the second receiving unit 207, analyzes the communication signal, and supplies the decoded signal to the user interface unit 205 as necessary. Especially, in the present embodiment, the second communication signal processing unit 209 determines whether the communication signal such as the AC signal includes warning information such as the earthquake early warning. If it is included, the second communication signal processing unit 209 supplies the warning information to the user interface unit 205. In a case where an emergency state due to natural disaster or a man-made disaster occurs, the AC signal includes warning information. But, in a case where such an emergency state does not occur, warning information is not included in the AC signal. The warning information may be output visually or aurally or both of visually and aurally via the user interface unit 205. In addition, when providing the user with the warning information, user's attention may be drawn by activating a vibrator. Information indicating whether the warning information has been received is reported to the mode determination unit 213.

The position information obtaining unit 211 obtains position information of the communication terminal or the user. The position information may be obtained by any proper method known in this technical field. For example, position information may be obtained by a global positioning system (GPS) scheme. In the case of the GPS scheme, information of latitude and longitude (or, latitude, longitude and sea level altitude) of the communication terminal are obtained as position information. Or, the position of the cellular base station may be used as position information of the communication terminal. The position information may be obtained at any proper timing. As an example, the position information may be obtained periodically. Or, the position information may be obtained according to a request from a user or a communication system. The position information that is obtained or calculated in the position information obtaining unit 211 is reported to the mode determination unit 213.

The mode determination unit 213 switches between an operation mode for processing a communication signal of the first communication system and an operation mode for processing a communication signal of the second communication system according to information from the first and the second communication signal processing units 203 and 209, and according to an obtaining status of position information. Although detailed operation performed by the mode determination unit 213 is described later, speaking broadly, the mode determination unit 213 stops the first receiving unit 201 and activates the second receiving unit 207 if the position information obtaining unit 211 can obtain position information of the user, in a case where communication is unavailable in the first communication system. If an AC signal received by the second receiving unit 207 does not include warning information, the mode determination unit 213 halts the second receiving unit 207 and activates the first receiving unit 201 again. On the other hand, when the position information obtaining unit 211 cannot obtain position information of the user, the mode determination unit 213 keeps the state in which the first receiving unit 201 is working, and in this case, the mode determination unit 213 does not activate the second receiving unit 207.

<3. Operation Example>
<<3.1 First Operation Example>>

Figure 3:
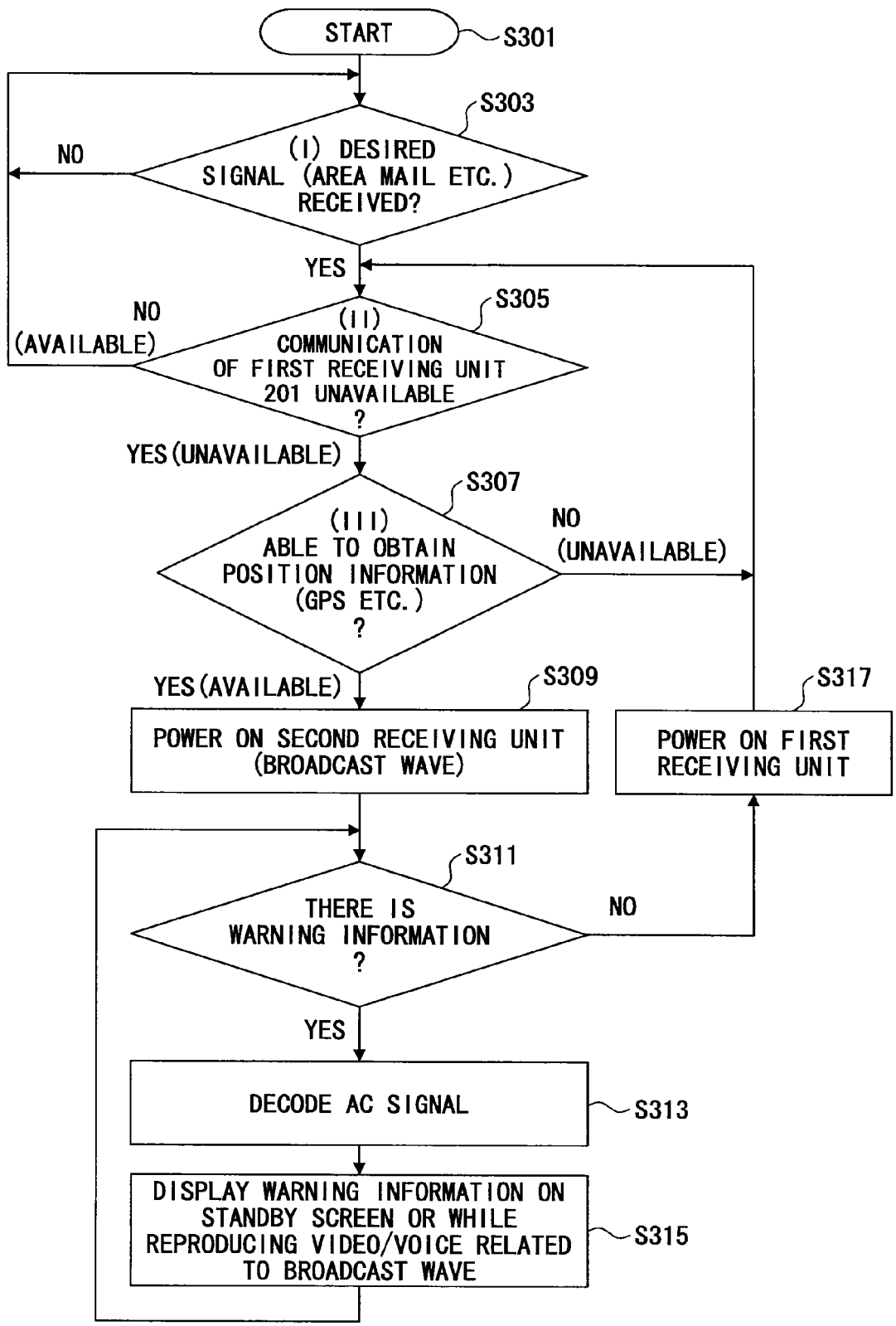
FIG. 3 is a flowchart showing a first operation example.

FIG. 3 shows a flowchart of an operation example of the communication terminal shown in FIG. 2. The flow starts from step S301, and goes to step S303. As a precondition of the operation, the communication terminal is working in the first communication system that is the cellular mobile communication system. That is, the communication terminal has started the first receiving unit 201 (FIG. 2), and is receiving a communication signal. In the present embodiment, if the communication terminal satisfies a predetermined mode change condition, the communication terminal changes the operation mode so as to receive a communication signal of the second communication system that is performing digital terrestrial television broadcasting. A first predetermined mode change condition (I) is that the communication terminal has received a predetermined signal in the first communication system. Therefore, in step S303, it is determined whether the predetermined signal has been received. The predetermined signal is an e-mail message in the cell broadcast service (CBS), for example.

In step S303, the flow remains in step S303 until the communication terminal receives the predetermined signal (until the first predetermined mode change condition (I) is satisfied). When the communication terminal receives the predetermined signal, the flow goes to step S305.

For example, when an emergency such as an earthquake occurs, the communication terminal receives an e-mail message by CBS so that the user can ascertain that the emergency has occurred. In a case where such an emergency occurs, various kinds of warning information such as the earthquake early warning and tsunami warning and the like are delivered repeatedly and each time when the information is updated. Therefore, the user who has received the warning information needs to obtain, with reliability, warning information that is delivered sequentially after that.

However, in a case where such a state of the emergency occurs, there is a fear that communication cannot be performed in the first communication system such as the cellular mobile communication system. For example, the communication service may be restricted due to failure or congestion in a base station or in an exchange station, for example. Or, it is also feared that the base station does not work properly due to an earthquake or tsunami or the like. A second predetermined mode change condition (II) is determined from this viewpoint. The second predetermined mode change condition (II) is that the communication terminal cannot perform communication by the first communication system.

In step S305, it is determined whether the communication terminal can receive a communication signal of the first communication system. If the communication terminal can receive a communication signal of the first communication system, the user can obtain warning information in the first communication system. In this case, since it is not necessary to change the mode, the flow returns to step S303, and processes already described are performed. In a case where the communication terminal cannot receive the communication signal of the first communication system (when the second predetermined mode change condition (II) is satisfied), the flow goes to step S307.

In a case where the communication terminal satisfies the first and the second predetermined mode change conditions (I&II), although there is a possibility that some sort of warning information may be delivered after that, the communication terminal cannot receive the communication signal of the first communication system. Therefore, it may be necessary to change the operation mode such that the communication terminal can obtain a communication signal from the second communication system. However, even though the communication terminal satisfies the first and the second predetermined mode change conditions (I&II), it's not always true that the communication terminal can receive the communication signal properly from the second communication system. It may be possible that the communication terminal cannot receive any significant communication signal even though the communication terminal tries to receive the communication signal by starting the second receiving unit 207. In such a case, the communication terminal consumes power wastefully due to change of the operation mode.

Based on this viewpoint, in the present embodiment, a third predetermined mode change condition (III) is defined. The third one (III) of the predetermined mode change conditions is that position information of the user can be obtained. The position information of the user is typically obtained by the GPS scheme. In a case where the position information can be obtained, there is a high possibility that the user is in an outdoor communication environment. When the user is in such a communication environment, the communication terminal can properly receive a communication signal of the second communication system that performs digital terrestrial television broadcasting. However, if the communication terminal cannot obtain the position information, there is a high possibility that the user is in an indoor communication environment. In the case where the user is in such an environment, there is a fear that the communication terminal cannot properly receive the radio wave of the digital terrestrial television broadcasting. Therefore, in step S307, it is determined whether the communication terminal can receive the position information of the user. In a case where the communication terminal cannot obtain the position information, the flow returns to step S305, and the communication terminal checks again whether the communication terminal receives a communication signal from the first communication system. If the communication terminal can receive the position information, the flow goes to step S309.

In step S309, the communication terminal activates the second receiving unit 207. In the case where the second receiving unit 207 is activated, the first receiving unit 201 is stopped typically. But, if it is possible to receive communication signals from both of the first and the second communication systems and if it is not necessary to restrict consumption of battery, it is not necessary to stop the first receiving unit 201. After the second receiving unit 207 is activated, the communication terminal receives a communication signal of the second communication system and analyzes the communication signal.

In step S311, it is determined whether an AC signal included in the communication signal of the second communication system includes warning information. When the AC signal includes the warning information, the flow goes to step S313.

In step S313, the second communication signal processing unit 209 of the communication terminal decodes the AC signal and extracts warning information.

In step S315, the extracted warning information is supplied to the user by the user interface unit 205. For example, the warning information may be displayed on a standby screen of the digital terrestrial television broadcasting. Alternatively, the warning information may be displayed in a display area of a program broadcasted by the digital terrestrial television broadcasting or in a surrounding area of the display area of the program. After that, the flow returns to step S311, and the communication terminal monitors next warning information.

On the other hand, in step S311, when it is determined that the warning information is not included in the AC signal, the flow goes to step S317.

In step S317, the communication terminal starts the first receiving unit 201. As described in step S309, the first and the second receiving units 201 and 207 are typically activated alternatively. Thus, the first communication unit 201 that is halted in step S309 is activated in step S317. After step S317, the flow returns to step S305, and processes already described are performed.

In this operation example, in step S307, only if the position information is obtained, the operation mode is changed in step S309, so that the communication signal of the second communication system is processed. If the position information is not obtained, the operation mode is not changed in step S309. Accordingly, useless change of operation modes can be effectively prohibited.

<<3.2 Second Operation Example>>

In the case of the first operation example, step S307 is performed for determining the third predetermined mode change condition (III) right after step S305 for determining the second predetermined mode change condition (II). But, this is not essential in the present embodiment. For example, as shown in FIG. 4, another operation example may be used. Although the operation example shown in FIG. 4 is similar to the operation example shown in FIG. 3 in general, the position of the step for the third one (III) of the predetermined mode change conditions is different. In FIG. 4, the same reference numbers are assigned to steps described in the flowchart of FIG. 3, and redundant description is not given.

In step S309, the second receiving unit 207 is activated, presence or absence of warning information is determined in step S311. If warning information is not included in the AC signal, the flow goes to step S317. In step S317, the second receiving unit 207 is halted, and the first receiving unit 201 is activated. After that, in step S401, it is determined whether the communication terminal can obtain position information of the user. If the communication terminal cannot obtain the position information, the flow returns to step S305, and it is checked whether the mobile terminal can receive a communication signal from the first communication system. In step S401, if the mobile terminal can obtain the position information, the flow goes to step S309, the first receiving unit 201 is stopped, and the second receiving unit 207 is activated.

In the case of the example shown in FIG. 3, in a case where the AC signal does not include the warning information in step S311, the flow always returns to step S305 so that availability of communication in the first communication system is determined. This method is preferable from the viewpoint of battery saving and the like since the communication terminal tries to obtain a desired signal (warning information) by the first communication system as much as possible. On the other hand, in the case of the example shown in FIG. 4, even when the AC signal does not include warning information in step S311, availability of communication in the first communication system is not determined and warning information is monitored in the second communication system as long as the position information of the user is properly obtained. This method is preferable from the viewpoint of obtaining warning information with reliability since there are many chances for monitoring warning information in the second communication system that performs digital terrestrial television broadcasting.

In the above, the present invention has been explained while referring to the specific embodiments. However, these are merely exemplary. Those skilled in the art will conceive of various modified examples, corrected examples, alternative examples, substituted examples, and the like.

For example, the present invention may be applied to any suitable mobile communication system that delivers warning information such as earthquake early warning. For example, the present invention may be applied to systems of W-CDMA scheme, W-CDMA systems of the HSDPA/HSUPA scheme, systems of the LTE scheme, systems of the LTE-Advanced scheme, systems of the IMT-Advanced scheme, WiMAX, Wi-Fi scheme systems and the like.

While specific numerical value examples are used to facilitate understanding of the present invention, such numerical values are merely examples, and any appropriate value may be used unless specified otherwise. Classification into each embodiment or item in the description is not essential in the present invention, and features described in two or more embodiments or items may be combined and used as necessary. Subject matter described in an item may be applied to subject matter described in another item (provided that they do not contradict).

It is not always true that the boundaries of the functional units or the processing units in the functional block diagram correspond to boundaries of physical components. The operations by the plural functional units may be physically performed by a single component. Alternatively, the operations by the single functional unit may be physically performed by plural components.

For convenience of explanation, the apparatus according to the embodiment of the present invention has been explained by using a functional block diagram. However, the apparatus may be implemented in hardware, software, or a combination thereof. The software may be stored in any proper storage medium such as a RAM (Random Access Memory), a flash memory, a ROM (Read Only Memory), an EPROM, an EEPROM, a register, a hard disk (HDD), a removable disk, a CD-ROM, a database, a server and the like.

The present invention is not limited to the above-mentioned embodiment and is intended to include various variations, modifications, alterations, substitutions and so on without departing from the spirit of the present invention.

The present application claims priority based on Japanese patent application No. 2011-178294, filed in the JPO on Aug. 17, 2011, and the entire contents of the Japanese patent application No. 2011-178294 are incorporated herein by reference.

DESCRIPTION OF REFERENCE SIGNS 201 first receiving unit
203 first communication signal processing unit
205 user interface unit
207 second receiving unit
209 second communication signal processing unit
211 position information obtaining unit
213 mode determination unit

The invention claimed is:
1. A communication terminal comprising:
a first receiving unit configured to receive a communication signal in a first communication system;
a second receiving unit configured to receive a communication signal in a second communication system;
a position information obtaining unit configured to obtain position information of a user;
a mode determination unit configured to
receive first warning information in the first communication system, after receiving the first warning information in the first communication system, determine whether the first receiving unit is receiving a signal, when the first receiving unit is not receiving a signal, determine whether the position information obtaining unit is obtaining the position information of the user, and when the first receiving unit is not receiving a signal after receiving the first warning information and the position information obtaining unit is obtaining the position information, power on the second receiving unit; and a user interface unit configured to provide the user with second warning information extracted from the communication signal received by the second receiving unit.

2. The communication terminal as claimed in claim 1, wherein the first communication system is a cellular mobile communication system, and the second communication system is a communication system for performing digital terrestrial television broadcasting.

3. The communication terminal as claimed in claim 2, wherein the communication signal received by the second receiving unit includes an Auxiliary Channel (AC) signal.

4. The communication terminal as claimed in claim 3, wherein, if the AC signal does not include the second warning information, the mode determination unit stops the second receiving unit, and activates the first receiving unit.

5. The communication terminal as claimed in claim 1, wherein, if the position information obtaining unit cannot obtain the position information of the user, the mode determination unit maintains a state in which the first receiving unit is working.

6. A warning information obtaining method comprising:
after a communication terminal receives first warning information in a first communication system, determining whether the communication terminal is receiving a signal in the first communication system;

when the communication terminal is not receiving the signal in the first communication system after the communication terminal receives the first warning information, determining whether the communication terminal is obtaining position information of a user;

when the communication terminal is not receiving the signal in the first communication system after the communication terminal receives the first warning information and is obtaining the position information of the user, powering on a receiving unit configured to receive a signal in a second communication system; and providing the user with second warning information extracted from the communication signal received by the receiving unit.

7. A communication terminal comprising:
a first receiver configured to receive a communication signal in a first communication system;
a second receiver configured to receive a communication signal in a second communication system;
a position information receiver configured to obtain position information of a user;
a non-transitory computer-readable storage medium storing computer-readable instructions thereon, which, when executed by the communication terminal, cause the communication terminal to
receive first warning information in the first communication system,
after receiving the first warning information in the first communication system, determine whether the first receiver is receiving a signal,
when the first receiver is not receiving a signal, determine whether the position information receiver is obtaining the position information of the user, and
when the first receiver is not receiving a signal after receiving the first warning information and the position information receiver is obtaining the position information, power on the second receiver; and
a user interface configured to provide the user with second warning information extracted from the communication signal received by the second receiver.

* * * * *